United States Patent [19]
Ellis

[11] Patent Number: 5,868,379
[45] Date of Patent: *Feb. 9, 1999

[54] SAFETY STAND FOR TRAILER LOADING

[75] Inventor: Elwood Blair Ellis, Indian River, Canada

[73] Assignee: Rite-Hite Holding Corporation, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 591,013

[22] Filed: Jan. 25, 1996

[51] Int. Cl.$^6$ ........................................................ B66F 3/00
[52] U.S. Cl. ........................ 254/124; 269/133 R; 269/134
[58] Field of Search ................................ 254/8 B, 8 C, 254/9 R, 9 B, 9 C, 10 R, 10 B, 10 C, 133 R, 124, 134; 187/206

[56] References Cited

U.S. PATENT DOCUMENTS

| | | |
|---|---|---|
| 1,786,463 | 12/1930 | Thomas . |
| 2,766,007 | 8/1956 | Krilanovich ............................ 254/124 |
| 2,841,247 | 7/1958 | Smalley .................................... 254/98 |
| 3,183,854 | 5/1965 | Candlin, Jr. et al. . |
| 3,250,506 | 5/1966 | Thouvenelle et al. . |
| 3,392,944 | 7/1968 | Wyrough . |
| 3,556,481 | 1/1971 | Mueller et al. . |
| 4,023,649 | 5/1977 | Wood ..................................... 187/206 |
| 4,037,822 | 7/1977 | Barcella . |
| 4,099,695 | 7/1978 | Shinn, Jr. . |
| 4,113,065 | 9/1978 | Sikli . |
| 4,261,682 | 4/1981 | Papps et al. . |
| 4,397,594 | 8/1983 | Hammonds et al. . |
| 4,452,147 | 6/1984 | Jwuc . |
| 4,456,278 | 6/1984 | Chapman . |
| 4,456,413 | 6/1984 | Pavlick . |
| 4,462,569 | 7/1984 | Arzouman . |
| 4,524,699 | 6/1985 | Pavlick . |
| 4,547,107 | 10/1985 | Krause . |
| 4,573,663 | 3/1986 | Nussbaum . |
| 4,636,119 | 1/1987 | Terlecky . |
| 4,671,714 | 6/1987 | Bennett . |
| 4,712,653 | 12/1987 | Franklin et al. . |
| 4,718,800 | 1/1988 | Engle . |
| 4,724,930 | 2/1988 | VanLierop . |
| 4,743,150 | 5/1988 | Hlinsky . |

(List continued on next page.)

FOREIGN PATENT DOCUMENTS

| | | |
|---|---|---|
| 1 197 500 | 12/1985 | Canada . |
| 0 510 372 A1 | 10/1992 | European Pat. Off. . |
| 0 510 372 B1 | 10/1992 | European Pat. Off. . |
| 0 510 467 A1 | 10/1992 | European Pat. Off. . |
| 1.334.344 | 5/1962 | France . |
| 1334344 | 7/1963 | France ................................... 254/124 |
| 2636717 | 3/1990 | France . |
| 3425 498A1 | 3/1985 | Germany . |
| 927806 | 6/1963 | United Kingdom ................... 254/124 |
| 2 237 329 | 1/1991 | United Kingdom . |
| WO 90/09339 | 8/1990 | WIPO . |

OTHER PUBLICATIONS

Joyce–Dayton Corp., Concept drawing, Jan. 15, 1986; 1 page.

*Primary Examiner*—James G. Smith
*Assistant Examiner*—Lee Wilson

[57] ABSTRACT

A collapsible trailer safety stand may be positioned adjacent the front of a loading bay a predetermined distance away from a dock. The stand in one position engages adjacent the kingpin of an unfettered trailer. It has a top and bottom and has located proximate its bottom a base having pivotally attached thereto at least one lifting arm and at least one stabilizing arm. The arms have pivotally attached therewith a support which moves from a first position wherein the support is disposed substantially within the base and the safety stand lays substantially flat in the loading bay to a second position wherein the support is disposed adjacent the kingpin. The arms are engaged with a drive to drive the support from the first position to the second position locating the mechanism adjacent to the kingpin of the tractor trailer. The collapsible safety stand in use prevents nose diving of the trailer when the trailer is being loaded or unloaded.

21 Claims, 8 Drawing Sheets

U.S. PATENT DOCUMENTS

| | | |
|---|---|---|
| 4,822,004 | 4/1989 | VanLierop . |
| 4,858,888 | 8/1989 | Cruz . |
| 4,865,295 | 9/1989 | Holloway . |
| 4,921,074 | 5/1990 | Ochs . |
| 5,013,011 | 5/1991 | Halloway . |
| 5,017,064 | 5/1991 | Kirwan . |
| 5,017,065 | 5/1991 | Krug et al. . |
| 5,020,445 | 6/1991 | Adams, Jr. . |
| 5,048,896 | 9/1991 | Channell . |
| 5,052,868 | 10/1991 | Hesch et al. . |
| 5,100,105 | 3/1992 | Schneider et al. . |
| 5,107,772 | 4/1992 | Viens . |
| 5,112,172 | 5/1992 | Engle . |
| 5,224,311 | 7/1993 | Pearce . |
| 5,291,835 | 3/1994 | Wicks . |
| 5,322,143 | 6/1994 | Curran . |
| 5,340,082 | 8/1994 | Holloway ................................ 254/124 |
| 5,407,309 | 4/1995 | Hesch et al. . |
| 5,490,748 | 2/1996 | Hapeman . |

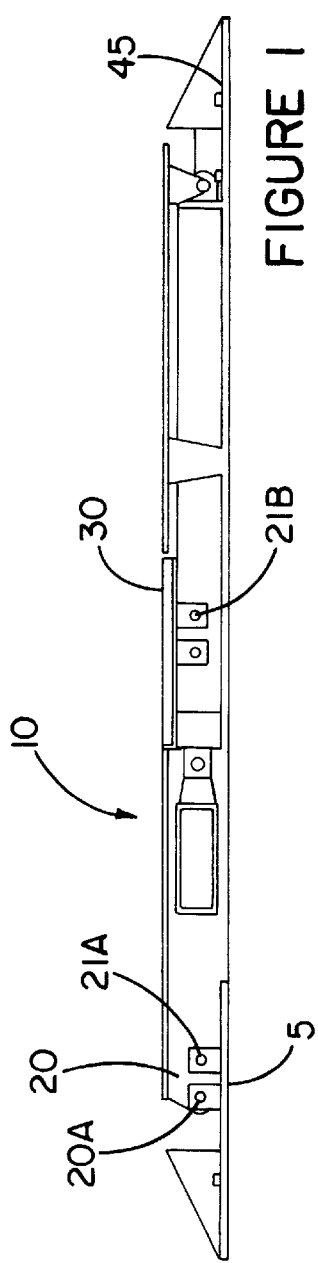
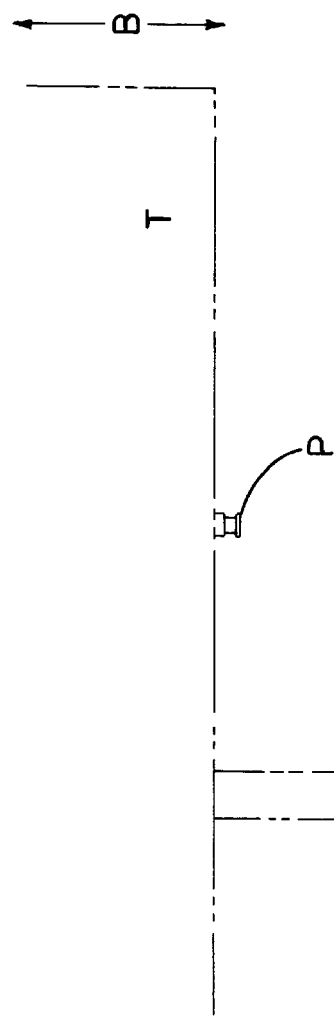
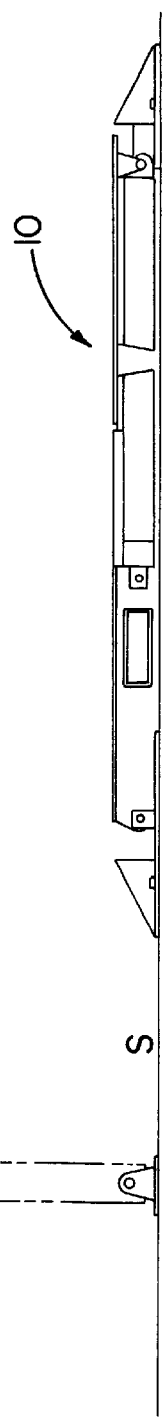

SAFETY STAND FOR TRAILER LOADING

FIELD OF INVENTION

This invention in the preferred embodiment relates to tractor trailers and specifically to so-called "spotted" trailers which have been decoupled from the tractor at a loading dock and which will be secured in a position by a safety locking device which engages the kingpin normally engaged by the tractor.

BACKGROUND OF THE INVENTION

It is known in the trucking industry to "spot" a trailer by decoupling the tractor from the trailer after the trailer is positioned at a loading dock. A kingpin is provided adjacent the front bottom portion of the trailer whose construction is well known in the art. Typically the tractor includes a biased coupling plate (fifth wheel) for latching engagement with the kingpin. However, with the trailer spotted, the kingpin is exposed, and the front end of the trailer is thus unsupported.

Because of this lack of support, there are typically provided support members known as "landing gear" and disposed along the body of a trailer towards the front of a trailer. The landing gear is typically cranked down to engage the ground so as to enable the trailer to be disengaged from the tractor. The landing gear is then intended to remain in engagement with the ground to keep the trailer from toppling over.

When a spotted trailer is located at the dock if loaded in a conventional manner, for example by a fork truck, the fork truck may drive forward past the cranked down landing gear and hence risk toppling or "nose-diving" the trailer. Jack stands therefore may be provided adjacent the front of the trailer. However these are manually operated stands which are positioned near each edge of the front of the trailer before loading. Unless these jack stands engage the metal plate reinforcement surrounding the kingpin or engage the kingpin itself then there is the risk of the failure of the stand or the trailer during loading and resulting nose-diving of the trailer. For example if the jack stands engage the floor channel of the trailer, which channels may be corroded, or the wooden floor boards of the trailer, depending on the load distribution an accident may occur.

It would therefore be advantageous to provide a more substantial and preferably centrally disposed support for the trailer proximate the front end thereof, which support would engage adjacent to the metal plate reinforcement surrounding the kingpin or engage the kingpin itself, which pin is normally engaged by the tractor, and thereby prevent the trailer from nose-diving or alternatively tail diving (if the rear wheels of the trailer are positioned so as to provide a considerable overhang toward the rear of the trailer) during normal loading.

U.S. Pat. No. 5,165,265 provides, in combination with a security lock, support legs for engaging the support surface adjacent the forward end of an associated trailer.

U.S. Pat. No. 4,014,517 describes one example of a stand for supporting a structure such as a mobile home above the ground. The stand includes a flat broad base for engaging the ground and a plurality of legs assembled to the base. The legs converge from the base to a support 22 so that the support platform may be positioned in a firm supportive relationship to the structure. Manual operation of a handle 63 provides for the hydraulic jacking of the support 22 to engage a structural member of the mobile home or the like.

U.S. Pat. No. 4,169,579 provides a support assembly for supporting a tongue of a trailer and adjustable to establish the tongue at a desired elevation from the ground so as to enhance hitching to a towing vehicle.

Nowhere in the prior art is there provided a collapsible, (for example folding), safety stand for engagement in one position, for example to the kingpin of an unfettered or spotted trailer or the like or that may be positioned adjacent the kingpin of the trailer proximate the reinforcing plate provided with the kingpin to provide prevention of nose-diving of the trailer during loading or unloading and which safety device may be alternatively positioned in a flat stored position to allow a tractor access for hitching the trailer.

It is therefore a primary object of the invention to provide a collapsible (for example folding), trailer safety stand which is located in the bay in which a trailer is normally docked.

It is a further object of the invention to provide a collapsible (for example folding), safety stand which has a portion which engages adjacent to or to the kingpin of an unfettered or spotted trailer, which is normally engaged by a tractor when locating the trailer in a docked position.

It is yet a further object of the invention to provide a collapsible (for example folding), safety stand which has a moveable portion which engages adjacent to, or to the kingpin of an unfettered or spotted trailer, which is normally engaged by a tractor when locating the trailer in the docked position. The moveable portion may further accommodate various lengths of trailers.

Further and other objects of the invention will become apparent to those skilled in the art when considering the following summary of the invention and the more detailed description of the preferred embodiments illustrated herein.

SUMMARY OF THE INVENTION

According to a primary aspect of the invention there is provided a collapsible trailer safety stand comprising a base locatable adjacent the front of a loading bay a predetermined distance away from a dock so as to be located adjacent the kingpin of an unfettered or spotted trailer, the kingpin normally being engaged by a tractor and the unfettered or spotted trailer being positioned in the loading bay adjacent to the dock when the trailer is disconnected from the tractor. The collapsible safety stand has a top and bottom and a base located proximate its bottom, the base having pivotally attached thereto at least one lifting arm and at least one stabilizing arm, said arms having pivotally attached therewith a support, and preferably a kingpin engaging mechanism, disposed proximate the end of said arms remote the base. The support is moveable from a first position wherein the support is disposed substantially within the base whereat the safety stand lays substantially flat in the loading bay so as not to interfere with the movement of a tractor trailer when decoupling the trailer, to a second position wherein the support is disposed adjacent the kingpin. The support is also preferably movable to a third position wherein, when the support is a kingpin engaging mechanism, the support locks the trailer in a locked position. In such a position, the arms are disposed at an angle greater than ninety degrees from the first position, and the support engages against the kingpin with a force sufficient to prevent the forward motion of the trailer, to lock the trailer substantially in the dock of the loading bay when the trailer is docked. The arms are engaged with a drive (preferably a hydraulic cylinder or a pneumatic cylinder or mechanical/ electric drive) to drive said support from the first position to the second position locating the mechanism adjacent to said kingpin of said tractor trailer, (and preferably to said third locked position when the support engages the kingpin) whereby the collapsible safety stand prevents nose-diving of the trailer when the trailer is being loaded or unloaded by conventional means. For example, if a fork truck were to drive in an empty trailer toward the front thereof adjacent to the kingpin past the landing gear supports provided along the body of a trailer towards the front of a trailer which are cranked down to engage the ground, depending on the method of loading of the trailer, there is a risk of overturning the trailer. By using the trailer safety stand such a problem is obviated, especially when the support engages the kingpin since only slight lateral movement is possible.

In a preferred embodiment of the invention when the support engages the kingpin, the support has a generally V-shaped notch provided therewith to engage the kingpin in order to locate the kingpin as close to the notch as possible when the support moves to the third position. The V-shaped notch will provide, during movement from the second to the third position, a constant camming force tending to center the kingpin of the trailer in the support as the support pushes against the kingpin at the third position. The trailer may therefore initially or during progressive stages of loading be moved laterally as a result of said constant force, regardless of the point of engagement of the generally V-shaped notch with the kingpin, within the boundaries of the support.

In one embodiment the at least one stabilizing arm is offset toward the end of the support not having the generally V-shaped notch therein. The support therefore having the generally V-shaped notch provides a constant camming force resulting in the shifting of a trailer toward the center line of the bay if the trailer was not already properly positioned by the tractor at that point. Further by preferably having the support engage the kingpin, normally engaged by the tractor, in the second position, further movement of the support to the third position may under the constant force exerted drive the trailer back toward the dock if the trailer is empty or in the process of being unloaded, wherein the third position becomes a locking position preventing forward movement of the trailer against the constant force applied by the safety stand.

According to yet another aspect of the invention there is provided a collapsible trailer safety stand to be located adjacent the kingpin of an unfettered or spotted trailer the kingpin being surrounded by a mounting plate and normally engaged by the tractor of the vehicle. In this embodiment, the collapsible trailer safety stand includes a stationary base having two ends and having at least one rail or channel extending from proximate one end to proximate the other end.

It also includes a sled that is moveable within said base from proximate one end to proximate the other end of said base, the sled having side members and bearing members extending laterally away from the side members thereof in engagement with the at least one rail or channel of said base. The bearing members are thus prevented from leaving the at least one rail or channel by the side members of the sled and the at least one rail or channel.

The base preferably includes a multiplicity of stop positions for the sled between the ends of the base, for example to allow for various unfettered trailer lengths.

The sled has pivotally attached thereto at least one lifting arm and at least one stabilizing arm, said arms having pivotally attached therewith a support, and preferably a kingpin engaging mechanism, disposed proximate the end of said arms remote said base and being moveable from a first position wherein the support is disposed substantially within the sled, whereat the support lays substantially flat in the sled so as not to interfere with the movement of a tractor trailer when decoupling the trailer, to a second position wherein the support is disposed adjacent the kingpin. The support is also preferably movable to a third position wherein, when the support is a kingpin engaging mechanism, the support locks the trailer in a locked position. In such a position the arms are disposed at an angle greater than ninety degrees from the first position, and the support engages against the kingpin with a force sufficient to prevent the forward motion of the trailer to lock the trailer substantially in the dock of the loading bay when the trailer is docked. The arms are engaged with a drive (preferably a hydraulic cylinder or a pneumatic cylinder or a mechanical/ electrical drive) to drive said support from the first position to the second position locating the support adjacent to said kingpin of said tractor trailer, (and preferably to said third position when the support locks the kingpin).

The sled is moveable within the base, when the support is in the first stored position, to and from proximate the trailer by a second drive preferably engaged with one of the bearing members on the sled to locate the sled at one of the preferred multiplicity of stop positions proximate the nose of the unfettered trailer for any size trailer so that the support is able to accurately move at least to the second position. For this purpose, the sled has a sensor in communication with the drive to sense when the sled is adjacent the nose of the unfettered trailer to locate the sled at a position consistent with the length of the trailer such that when the support moves it will be in the correct second position and preferably be at the kingpin engaging position.

This embodiment preferably includes means for locking the sled at the multiplicity of stop positions when the support is moved to the second position. Preferably the second drive is a hydraulic cylinder having a tab extending from the pivot thereof remote the support which will not interfere with the motion of the sled when the support is in the first position but which will engage a predetermined portion of the base at each of the multiplicity of stop positions when the support moves to the second position (preferably engaging a flat plate interconnecting the sides of the base proximate each stop position).

This embodiment of the collapsible safety stand, when in the second or preferred third position, thus prevents nose-diving of the trailer when the trailer is being loaded by conventional means.

In one embodiment when the first drive is a hydraulic cylinder a hose reel is provided with the stationary base proximate the end of the base remote the trailer which hose reel takes up and lets out hose as the sled moves toward or away from the unfettered trailer. In another embodiment when the second drive is a hydraulic motor, a cable reel is provided with the stationary base proximate the end of the base remote the trailer which cable reel takes up and lets out cable as the sled moves toward or away from the unfettered trailer.

In a preferred embodiment of the invention when the support engages the kingpin, the support has a generally V-shaped notch provided therewith to engage the kingpin in order to locate the kingpin as close to the notch as possible when the support moves to the third position. The V-shaped notch will provide, during movement from the second to the third position, a constant camming force tending to center the kingpin of the trailer in the support as the support pushes against the kingpin to the third position. The trailer may therefore be initially or during progressive stages of unloading moved laterally as a result of said constant camming force, regardless of the point of engagement of the generally V-shaped notch with the kingpin, within the boundaries of the support.

In one embodiment the at least one stabilizing arm is offset toward the end of the support not having the generally V-shaped notch therein. The support therefore having the generally V-shaped notch thus provides a constant camming force resulting in the shifting of a trailer toward the center line of the bay if the trailer was not already properly positioned by the tractor at that point. Further by preferably having the support engage the kingpin, normally engaged by the tractor, in the second position, further movement of the support to the third position may under the constant force exerted drive the trailer back toward the dock if the trailer is empty or in the process of being unloaded, wherein the third position becomes a preferred locking position preventing forward movement of the trailer against the constant force applied by the safety stand.

According to yet another aspect of the invention there is provided a collapsible machine including a stationary base having two ends and having at least one rail or channel extending from proximate one end to proximate the other end.

The machine includes a sled moveable within said base from proximate one end to proximate the other end of said base, said sled having side members and bearing members extending laterally away from the side members thereof into engagement with the at least one rail or channel of said base, the bearing members thus being prevented from leaving the at least one rail or channel by the side members of the sled and the at least one rail or channel.

The base preferably includes a multiplicity of stop positions for the sled between the ends of the base.

The sled has pivotally attached thereto at least one lifting arm and at least one stabilizing arm, said arms having pivotally attached therewith a support disposed proximate the end of said arms remote said base and being moveable from a first position wherein the support is disposed substantially within the sled, whereat the support lays substantially flat in the sled, to a second position wherein the support is disposed a vertical distance from the sled and the base. The support is also preferably movable to a third position whereat said arms are disposed at an angle greater than ninety degrees from the first position when laying flat in the sled. The arms are engaged with a drive (preferably a hydraulic cylinder or a pneumatic cylinder or a mechanical/electrical drive) to drive said support from the first position to the second position and preferably to said third position.

The sled is moveable within the base between the ends thereof, when the support is in the first stored position, to and from proximate a predetermined position by a second drive preferably engaged with one of the bearing members to locate the sled at one of the preferred multiplicity of stop positions so that the support is able to accurately move at least to the second position. The sled includes a sensor in communication with the drive to sense when the sled is adjacent the predetermined position to locate the sled thereat such that when the support moves it will be in the correct second position.

This embodiment preferably includes means for locking the sled at the multiplicity of stop positions when the support is moved to the second position, preferably the second drive is a hydraulic cylinder having a tab or clip extending from the pivot thereof remote the support which will not interfere with the motion of the sled when the support is in the first position but which engages a predetermined portion of the base at each of the multiplicity of stop positions when the support moves to the second position (preferably engaging a flat plate interconnecting the sides of the base proximate each stop position).

This embodiment of the collapsible machine, when in the second or preferred third position, may thus be used as a safety stand.

In one embodiment when the first drive is a hydraulic cylinder a hose reel is provided with the stationary base proximate the end of the base which hose reel takes up and lets out hose as the sled moves between the ends of the base. In another embodiment when the second drive is a hydraulic motor a cable reel is provided with the stationary base proximate the end of the base which cable reel takes up and lets out cable as the sled moves between the ends of the base.

According to yet another aspect of the invention there is provided a collapsible machine having located proximate its bottom a base having pivotally attached thereto at least one lifting arm and at least one stabilizing arm, said arms having pivotally attached therewith a support disposed proximate the end of said arms remote said base and being moveable from a first position wherein the support is disposed substantially within the base whereat the mechanism lays substantially flat, to a second position wherein the support is disposed a vertical distance from the base. The support is also preferably movable to a third position whereat said arms are disposed at an angle greater than ninety degrees from the first position when laying flat in the base. The arms are engaged with a drive (preferably a hydraulic cylinder or a pneumatic cylinder) to drive said support from the first position to the second position and preferably to said third position whereby the machine when in the second or preferred third position may be used as a safety stand.

In a preferred embodiment of the inventions described in the above paragraphs the at least one stabilizing arm and the at least one lifting arm cooperate to maintain the support substantially horizontal at all times whether in the first, second, or third positions or moving therebetween.

BRIEF DESCRIPTION OF THE DRAWINGS

FIG. 1 is a side plan view of the support illustrated in its collapsed, first position, and illustrated in a preferred embodiment of the invention.

FIG. 1A is a schematic view of the support of FIG. 1 illustrated in a loading bay occupied by a trailer and illustrated in a preferred embodiment of the invention.

DETAILED DESCRIPTION OF PREFERRED EMBODIMENTS OF THE INVENTION

Figure 2:
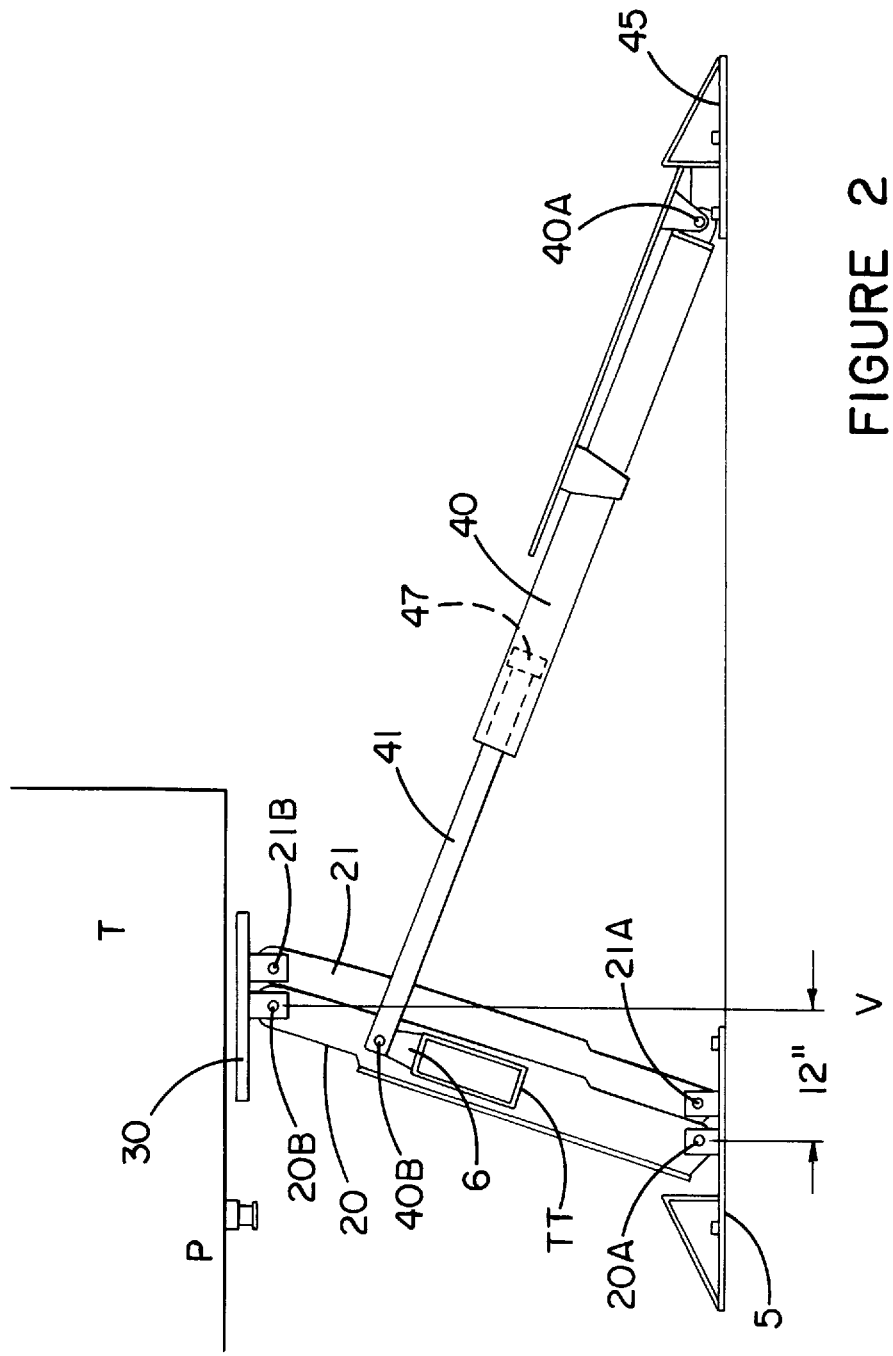
FIG. 2 is a side elevation view of the support of FIG. 1 shown in a second preferred position prior to engaging the kingpin of a trailer and illustrated in the preferred embodiment of the invention.
Figure 3:
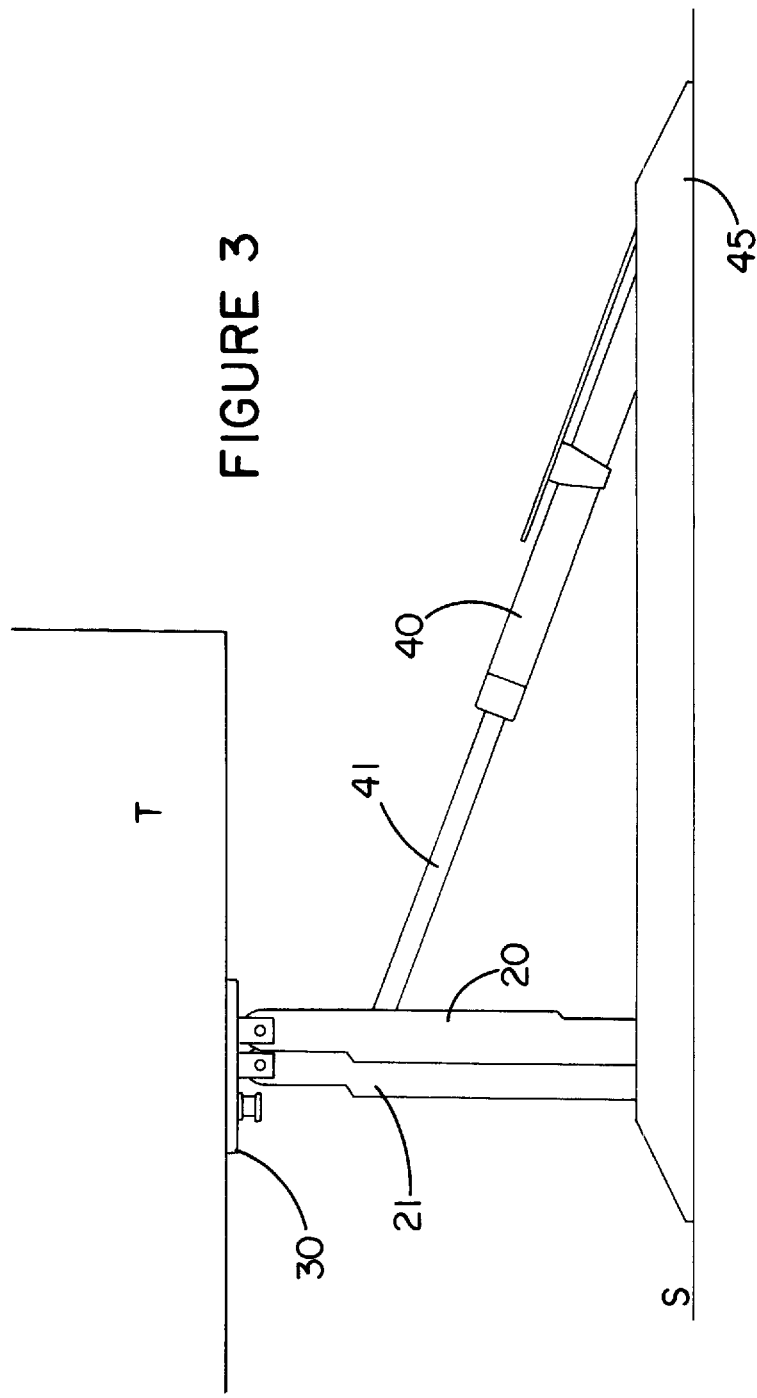
FIG. 3 is a schematic view of the support when engaging the kingpin of the trailer illustrated in an alternative embodiment of the invention to FIG. 2.
Figure 4:
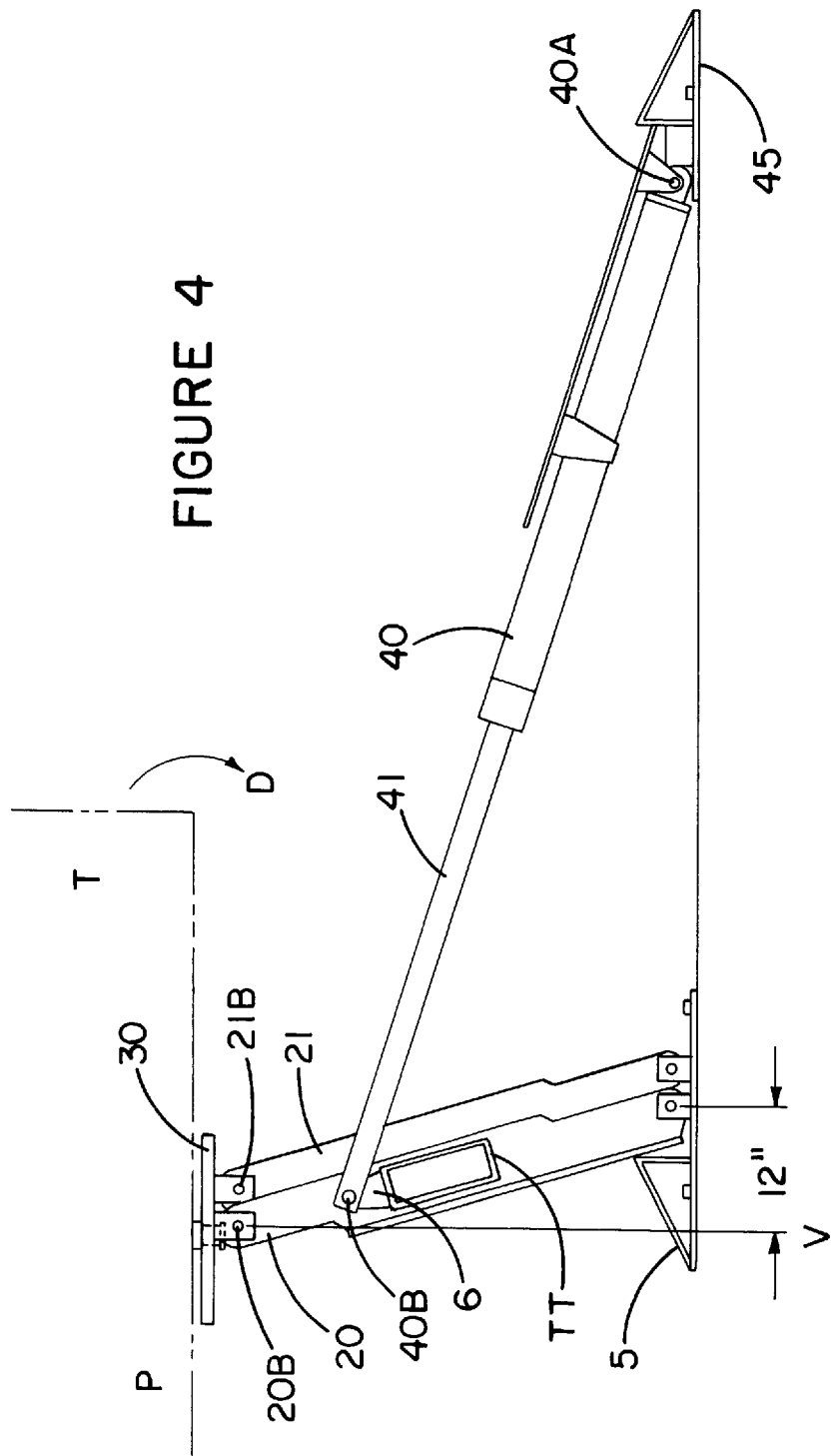
FIG. 4 is a view similar to FIGS. 2 and 3 illustrating the final or third position of the support illustrated in a preferred embodiment of the 10 invention.
Figure 5:
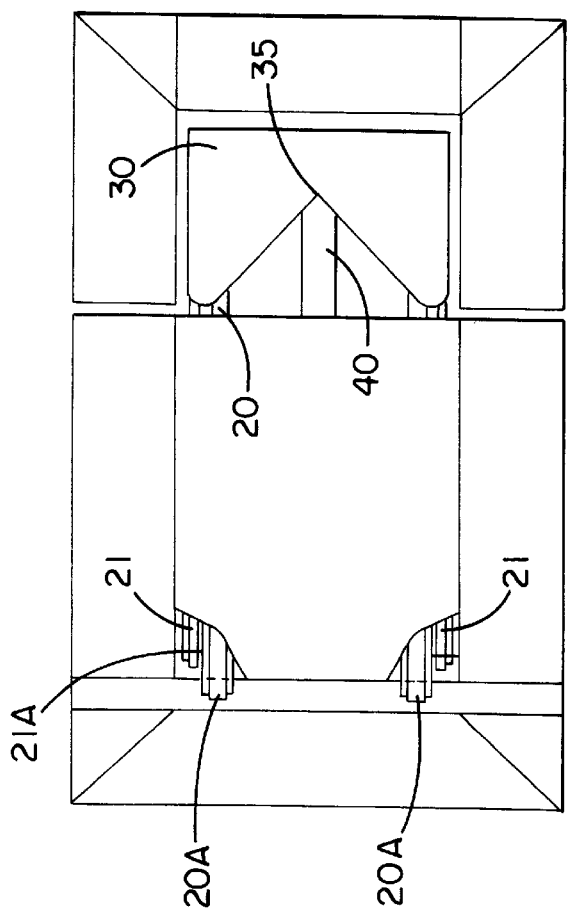
FIG. 5 is a top plan view of the invention illustrating a centering feature of the support and illustrated in a preferred embodiment of the invention.

Referring generally to FIGS. 1 through 5 there is illustrated a collapsible supporting device or trailer safety stand 10 located in loading bay B as shown in FIG. 1 and FIG. 1A. The trailer is supported upon a surface S on supports or "landing gear" W after the tractor has disengaged therefrom. The collapsible supporting device 10 is located on the surface S and is moveable from a first collapsed position substantially shown in FIGS. 1 and 1A to a raised position shown in FIG. 2 and 3 and finally to a locked position as shown in FIG. 4. In one embodiment the collapsible safety support stand may be anchored to the ground via baseplates 5 and 45. The baseplate 5 has pivotally attached thereto at pivot 20A lifting arms 20. A stabilizing arm 21 is pivotally attached to the baseplate 5 at pivot 21A. A support plate 30 substantially as seen in FIG. 5 is provided for engagement with the kingpin P normally engaged by the tractor. The plate 30 is pivotally attached to the two lifting arms 20 at pivots 20B and to the supporting arm 21 at pivot 21B. The two lifting arms and the stabilizing arm 20 and 21 respectively are aligned substantially parallel to one another during the phases of motion of the supporting device. A hydraulic cylinder 40 pivotally attached at 40A to baseplate 45 is provided for moving the arm 20 to and from the initial collapsed position seen in FIG. 1 to the final raised position best seen in FIG. 4. The rod 41 of cylinder 40 is attached to a piston 47 which is moved by hydraulic fluid in conventional manner. The extension therefore of the cylinder from its first collapsed position of FIG. 1 wherein the arm is substantially flat to a raised position as seen in FIG. 2 wherein the lifting arm and a stabilizing arm are substantially at an angle less than 90 degrees in relation to the baseplate 5. The piston rod 41 is attached to one of the arms 20 at a pivot 40B. The pivot 40B passes through a link 6. The pivot 40B is located proximate the narrow end of link 6 and a torque tube TT passes between both lifting arms 20 to interlock the two arms and to ensure that the motion of the cylinders is passed to both arms. The plate 30 is attached proximate the top of the lifting and stabilizing arms 20, 21 and engages the kingpin P as best seen in FIG. 4 preferably when arms 20, 21 are disposed at an angle greater than 90 degrees to the baseplate 5. (It may engage the kingpin at any angle with effective results.) In this position, the plate 30 pushes against the kingpin P as best seen in FIG. 5 so that the kingpin P may substantially move toward a centered position within the notch 35, plate 30 thereby moving the trailer T laterally to a substantially centered position within the bay. The trailer T may also be pressed substantially against the dock by the motion of the support of the collapsible safety stand to the preferred third position of FIG. 4 thereby providing a constant force against the trailer and locking the trailer from moving away from the dock since it cannot move forward against the constant force of the cylinder 40. (Throughout this disclosure the meaning of locked is defined in this manner.)

The trailer is then ready to safely load without the risk of turning over the trailer in a direction D should the safety support stand not be present.

Referring specifically to FIGS. 6 through 11, there is illustrated another preferred embodiment of the inventive safety stand 100. The advantage of FIGS. 6 through 11 over the previously described embodiment is that the design of the safety stand 100 will accommodate various lengths of trailers. For example, it is well known that trailers have various lengths of 40', 45', 48' and 53'. The present embodiment endeavors to provide a mechanism which will, when installed in a loading bay, compensate for the length of the trailer and preferably be locked in position once raised into engagement with the kingpin.

Figure 6:
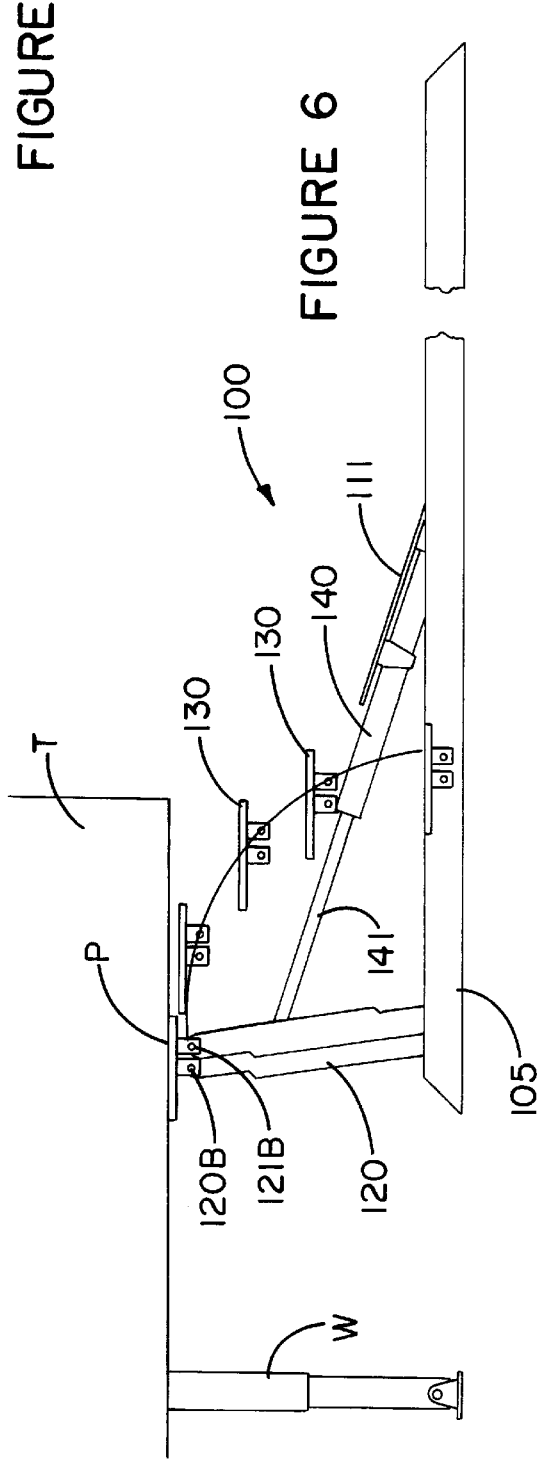
FIG. 6 is a side schematic view of a preferred embodiment of the invention similar to that described in relation to FIGS. 1 through 5 with the exception that the base includes therewith a moveable sled which houses the kingpin support, illustrated in a preferred embodiment of the invention.
Figure 7:
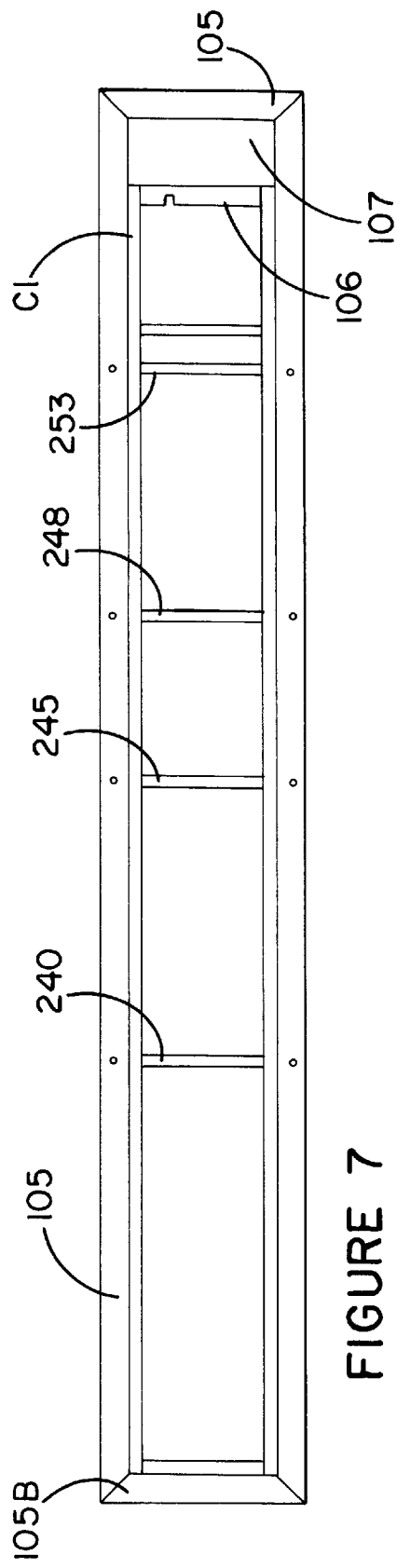
FIG. 7 is a top schematic view of the base 105 of FIG. 6 illustrated in a preferred embodiment of the invention.

FIG. 6 specifically refers to a trailer T which has been positioned and uncoupled from its tractor in a loading bay on a surface. In this regard, please refer to FIG. 1A. However, in this embodiment, the trailer may not be a fixed length, and therefore the base 105 must provide for a certain amount of flexibility in positioning the support 130 in relation to the kingpin P of the trailer. The kingpin typically has a supporting plate surrounding it to provide secure anchoring of the kingpin into the trailer. Such structures are well known in the art, and the reader is referred to those structures for further information in relation to the kingpin. Typically, a trailer is best engaged at the kingpin by my safety stand. Alternatively, my safety stand could be positioned adjacent a kingpin, but in doing so would not provide the locking feature, but would prevent severe nose-diving of the trailer.

Figure 8:
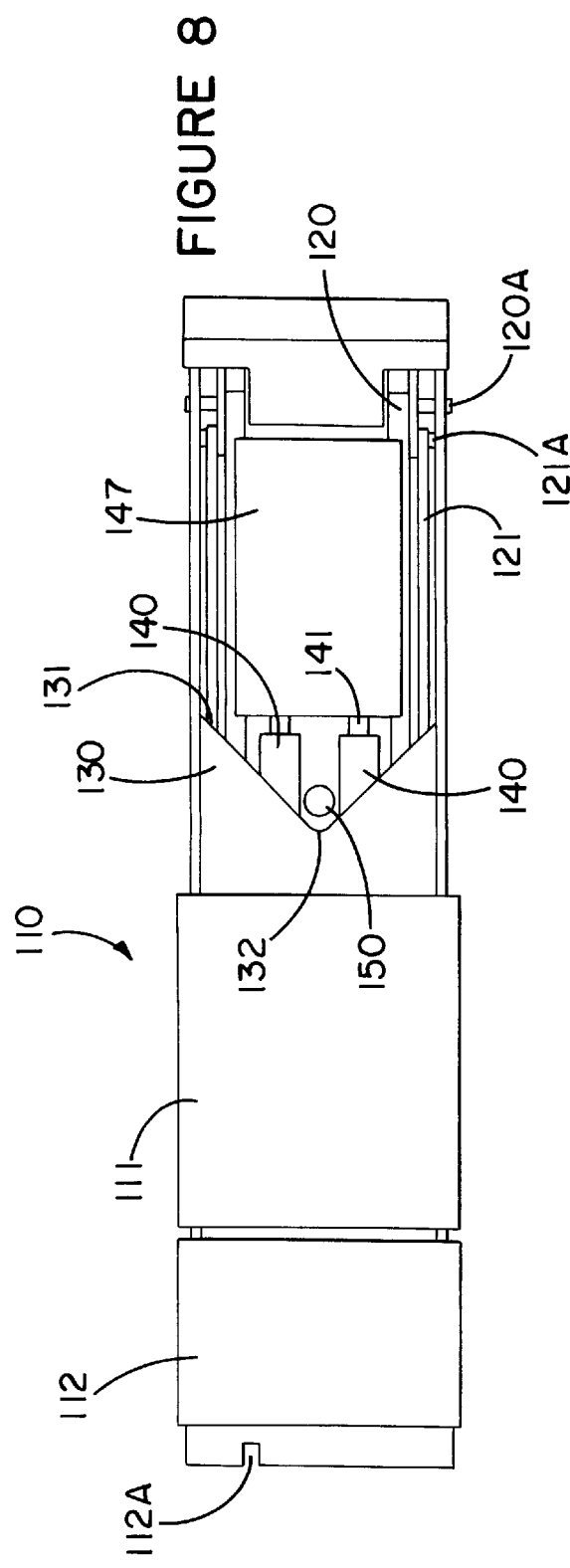
FIG. 8 is a top schematic view of the sled of FIG. 6 illustrated in a preferred embodiment of the invention.
Figure 9:
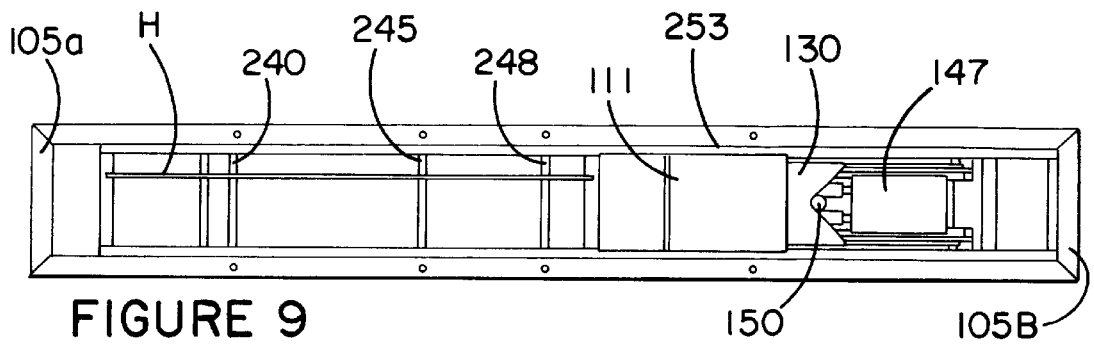
FIG. 9 is a top perspective view of the entire mechanism of FIG. 6 illustrated in a preferred embodiment of the invention.
Figure 9B:
FIG. 9B is an end view of FIG. 9.
Figure 9A:
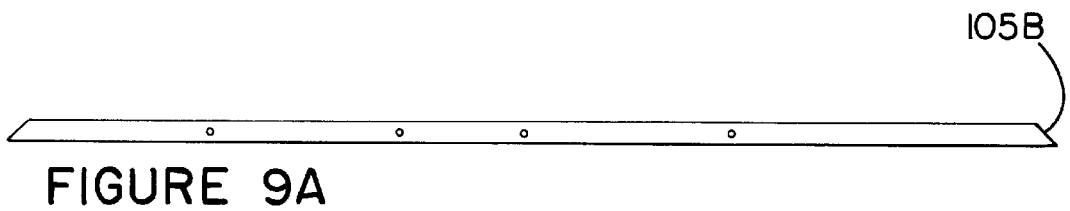
FIG. 9A is a side view of FIG. 9.
Figure 10:
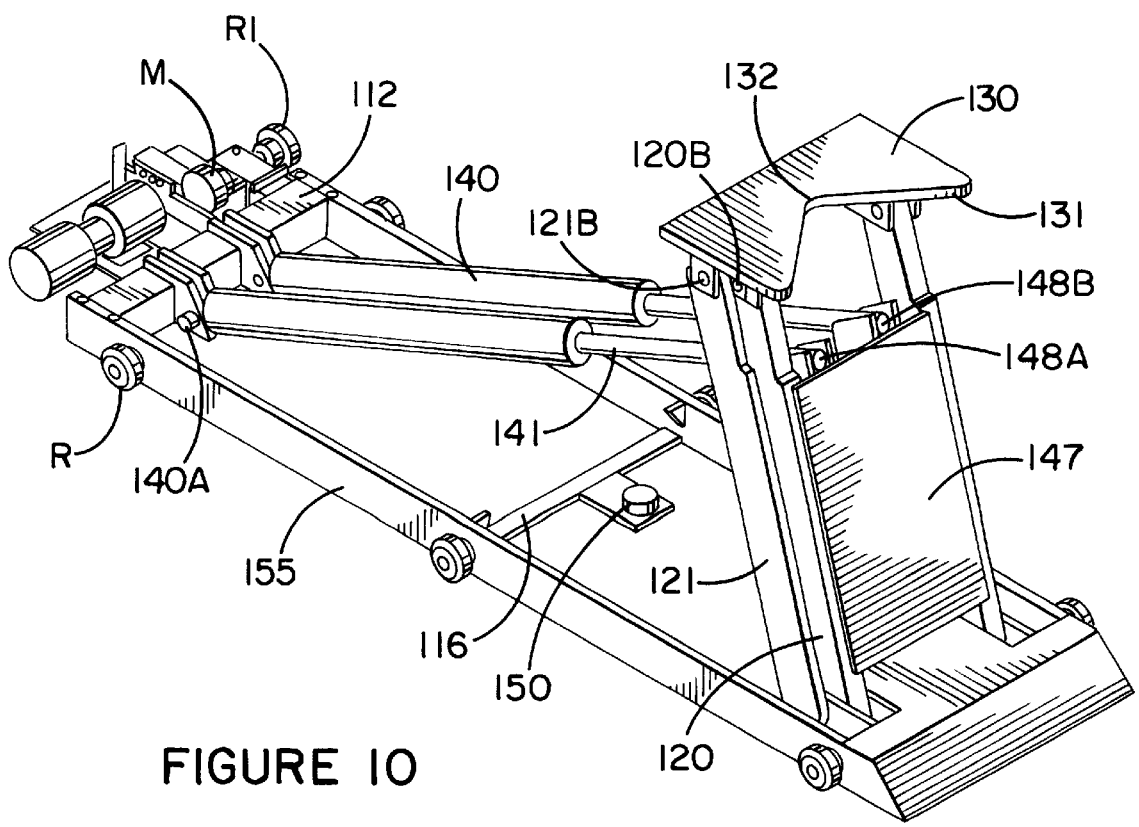
FIG. 10 is a perspective view of the sled of FIG. 8 illustrated in a raised position in a preferred embodiment of the invention.
Figures 11, 11A:
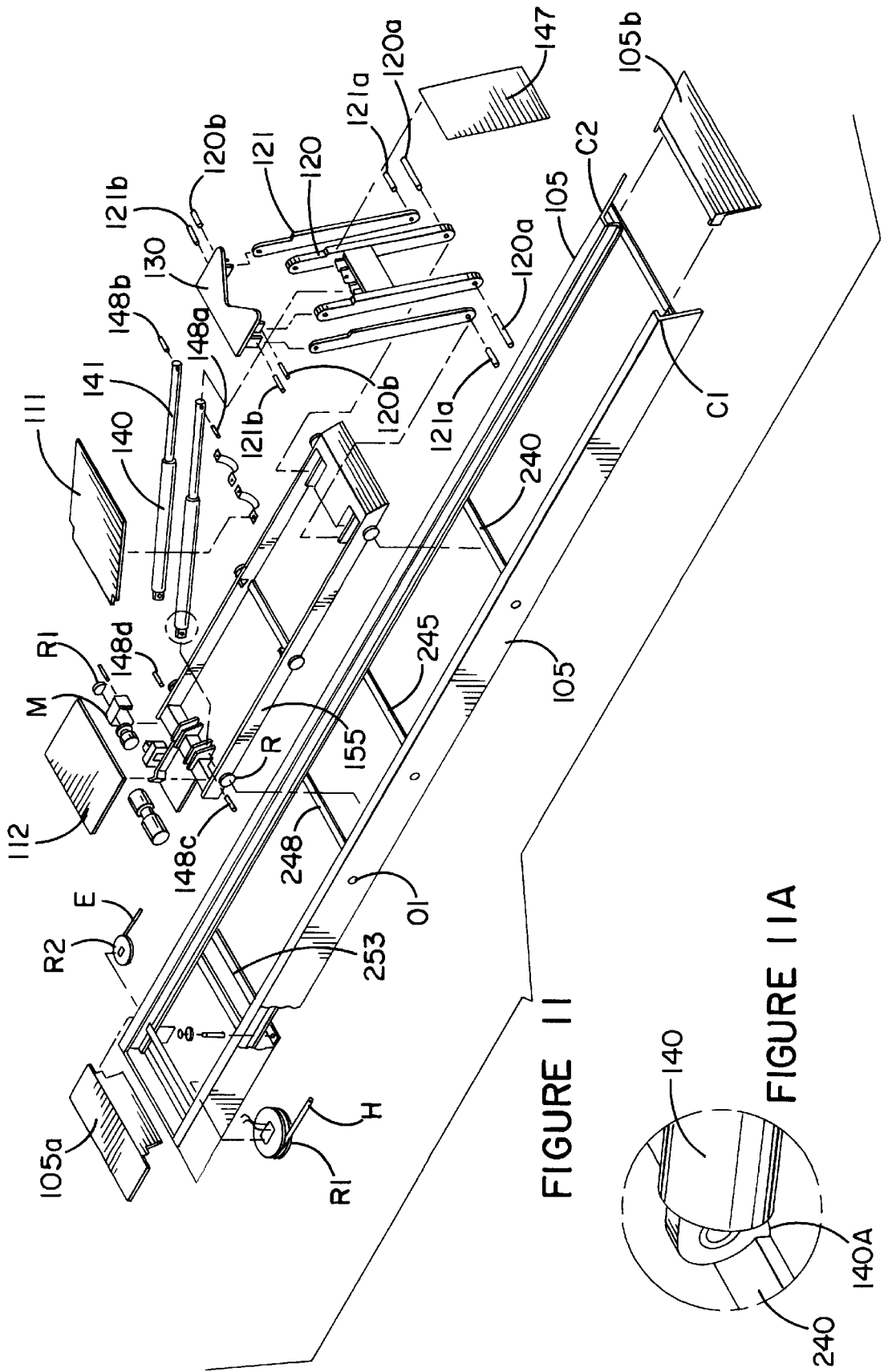
FIG. 11 is an exploded perspective view of the mechanism illustrated in FIGS. 6 through 10 and illustrated in a preferred embodiment of the invention.
FIG. 11A is a detail of a portion of FIG. 11.

Referring therefore to FIGS. 6 through 11, there is provided a base 105 which is set in position in a loading bay parallel to the loading bay. As best seen in FIG. 9A and B, the base 105 has a low profile which may be traversed by the wheels of a tractor when positioning the trailer. Therefore, it is highly recommended that the base 105 be structured of substantial material sufficiently rugged to withstand the pounding that the trucking industry would impart upon such a device. All components of this system are recommended to be of such a structure. The base contains a front end 105A and a rear end 105B. The front end 105A of the base 105 includes a notch 106 wherein a hose reel R1 and cable reel R2 lets out and takes up hydraulic hose H and electric cable E as best seen in relation to FIG. 11. The hose reels R1 and R2 therefore let out and takes up hydraulic hose H and electric cable E to feed the first drive (illustratively in the form of cylinders 140) and second drive (illustratively in the form of motor M) in a conventional manner. A cover member 112 is provided to protect these components from the elements. The base 105 has located along the length thereof reinforcing members 253, 248, 245 and 240 corresponding to the length of the trailer being docked in position. As best seen in FIG. 11, these flat bar elements are affixed by fasteners F1 at respective openings O1 within the side channels C1 of the base 105. The side channels C1 and C2 are provided for the purpose of allowing a sled 110 (to be described below) to move forward and reverse in the channels C1 and C2.

The sled 110 carries the various components making up a supporting assembly of the safety stand that is thus movable along the base, and that will raise to engage the kingpin, thus allowing the safety stand to accommodate trailers of various lengths. As best seen in relation to FIG. 10, bearing members illustratively in the form of rollers R are disposed on each side of the sled 110 and said rollers are contained within the channels C1 and C2. Therefore, in use the rollers cannot jump off of the rails C1 and C2. The sled 110 as best seen in FIGS. 8 and 10 will move on the rollers R in the base 105 until such time as the correct position for the respective trailer being locked is achieved. This position is determined by a sensor 150 provided adjacent one end of the sled 110, adjacent the support plate 130. This sensor may be a sonar device to sense when the nose of the trailer has been reached as the sled moves from a stored, distal position away from the dock toward the dock. This use of the sensor allows the sled to be positioned substantially in line with the kingpin to enable the support 130 to move from its collapsed position to the locking position substantially shown in FIG. 6. The structure and operation of the supporting assembly, including lifting arms 120, stabilizing arms 121, cylinders 140 and support 130 is substantially the same as the previous embodiment (FIGS. 1–5), except that they are carried on movable sled 110. The sensor 150 may be located intermediate the two cylinders 140 and be affixed to a flat bar 116 (as best seen in FIG. 10) positioned to sense the nose of the trailer and thereby position the safety stand for each respective trailer length.

Provided near the ends of the pivots for the cylinders 140 are engagement portions such as 140e which engage in front of each of the respective flat bar portions 240, 245, 248 or 253 when the safety stand is raised to its locking position as seen in detail A of FIG. 11. Normally, the detent of the pivot is retained on the flat bar prior to the cylinders extending. As the cylinders 140 extend in an upward motion, the detent of the pivot will tend to rest in the position shown in detail A of FIG. 11. This feature therefore provides locking of the safety stand in that particular position along the base 105, using a simple detent of a pivot which is rotated downwardly to abut the front of the flat bar as described above. This works in conjunction with the forward motion of the support plate 130 from a collapsed position contained within the sled to a second position adjacent the kingpin and to a kingpin engaging position (a third preferred locking position) wherein the kingpin is engaged by the substantially V-shaped portion of the support as best seen in relation to FIG. 10 and as was described in regard to the embodiment of FIGS. 1–5. A surface 131 therefore will engage the kingpin P and tend to center the kingpin toward the bottom of the V at 132. When a constant force is applied against the kingpin tending to center the kingpin in relation to the support 130, then a trailer may move laterally. Once locked in position by the forward motion of the cylinders 140 and the lifting arms 120 and stabilizing arms 121, in combination with the detent of the pivot of the cylinders 140 engaging the flat bar portion, then it can be readily seen that the safety stand does provide excellent locking benefits.

The lifting arms as best seen in FIG. 8, 10 and 11 are pivoted to the frame portion 155 of the sled 110 at pivots 120A and 121A respectively and proximate the support 130 at 120B and 121B. It is noted that the positioning of the pivots for the arm 121 are to the rear and to the lateral edges of the support plate 130 with respect to the pivots of the lifting arm 120 to keep the support horizontal at all times. The lifting arm 120 is engaged with a frame portion 147 which are engaged in turn by the rods 141 of the cylinders 140 by pivot pins 148a and 4b, to provide a firm braced supporting structure which will move coincidentally. The lower end of cylinders 140 are pivoted to sled 110 by pivots 148c and 148d. Also associated with cylinders 140 is a cover member 111, attached for movement with the cylinders 140 by support brackets 111b. The cover 111 keeps out the environment with the stand collapsed.

As best seen in FIG. 10, the sled is provided with a hydraulic motor assembly M which drives the powered roller R1 which drives the sled within the channels C1, C2 of base 105.

The operation of the sled in the base is therefore consistent with the description in relation to FIGS. 1 through 5 in that the support will move firstly with the sled to be positioned for the respective trailer being unloaded, for example a 53' trailer, and will once positioned be powered to raise from the collapsed position to a second position similarly as illustrated in FIG. 2 and to a locked position, a position similar to that which is illustrated in FIG. 4. At this position, a constant pressure is exerted against the kingpin P by cylinders 140. This constant pressure will tend to center the trailer as it is being unloaded and prevent the trailer from moving away from the dock.

Therefore, once a tractor positions a trailer in a loading bay, the driver will winch down the landing gear supports W to the supporting surface S and subsequently disconnect the trailer. The base 105 therefore is positioned in the loading bay and in a plurality of loading bays repetitively as is required by the depot being serviced. Once the driver leaves with the tractor, the safety stand is positioned in its locked position by an operator. The operator commences the initiation of the unit or this may be done automatically in a conventional manner. Once the sled moves in the base to the respective position for the particular trailer that has been positioned in the loading bay, the sled will stop (the nose of the trailer having been sensed by sensor 150) and then the supporting assembly will move from its first collapsed position to a second substantially vertical position to a third substantially locked position wherein the kingpin is engaged by the V-shaped engaging surface 131 of the support 130. The cylinders therefore provide a constant force to push back against the kingpin and prevent the trailer from nose-diving or alternatively tail diving depending on the structure of the trailer. The present invention therefore provides a safety stand that is collapsible and also which locks the trailer in position and provides a support adjacent a kingpin and a locking effort against the kingpin for the trailer regardless of the length of the trailer.

The sensor 150 which may be any reliable sensor such as sonar, infrared, or other known sensors, also includes the necessary electronics to start and stop the hydraulic motor M to position the sled in the base. The details of such a sensor and control system are of conventional structures and are therefore not described.

Alternatively, a fifth wheel may be used as the support structure with equal success, adding the ability to latch the kingpin. Further, a latch mechanism can be added to the kingpin engaging mechanism shown in the Figures with equal latching results.

As many changes can be made to the preferred embodiments of the invention without departing from the scope thereof; it is considered that all material contained herein be considered illustrative of the invention and not in a limiting sense.

The embodiments of the invention in which an exclusive property of privilege is claimed are as follows:

1. A collapsible trailer safety stand to be located adjacent the kingpin of an unfettered trailer, the kingpin being normally engaged by the tractor of the vehicle, the collapsible trailer safety stand comprising:

a stationary base having first and second ends and having at least one rail extending the length of the base, a sled moveable within the base between the first and second ends of the base, the sled having side members, and bearing members extending laterally away from the side members and into engagement with the at least one rail of the base, the bearing members being prevented from leaving the at least one rail by the side members of the sled and the at least one rail, the base including a plurality of reinforcing members defining stop positions for the sled between the ends of the base, to allow for various unfettered trailer lengths, the sled having pivotally attached thereto at least one lifting arm and at least one stabilizing arm, each of the at least one lifting and stabilizing arms having a proximal end pivotally attached to the sled, and a distal end, the arms having pivotally attached, at their respective distal ends, a support, the arms and the support being moveable from a first position wherein the support is disposed substantially flat within the sled so as not to interfere with the movement of the trailer, to a second position wherein the support is disposed adjacent the kingpin, the at least one lifting and stabilizing arms being engaged with a first drive, which drives the arms to move the support from the first position to the second position locating the support adjacent to the kingpin of the trailer, the sled being moveable within the base, when the support is in the first stored position, to and from proximate the trailer by a second drive to locate the sled at one of the stop positions proximate the nose of the unfettered trailer for any size trailer so that the support is able to accurately move at least to the second position, whereby the collapsible safety stand when in the second position prevents nose diving of the trailer when the trailer is being loaded or unloaded.

2. The collapsible safety stand of claim 1, wherein the sled includes a sensor in communication with the second drive to sense when the sled is adjacent the nose of the unfettered trailer to locate the sled at a position consistent with the length of the trailer such that when the support moves, it will be in the correct second position.

3. The collapsible trailer safety stand of claim 1 wherein the support is a kingpin engaging mechanism.

4. The collapsible trailer safety stand of claim 1 wherein the support is movable to a third position in which the at least one stabilizing and lifting arms are disposed at an angle greater than ninety degrees from the first position.

5. The collapsible trailer safety stand of claim 4 wherein the support has a generally V-shaped notch provided therewith to engage the kingpin in order to locate the kingpin as close to the notch as possible when the support moves to the third position, the camming force exerted at the V-shaped notch providing centering of the kingpin of the trailer in the V-shaped notch as the support pushes with a constant force against the kingpin to the third position.

6. The collapsible trailer safety stand of claim 1 wherein the sled includes an engagement portion for engaging one of the reinforcing members to prevent the sled and support from moving relative to the base, to lock the trailer substantially in the dock of the loading bay when the trailer is docked.

7. The collapsible trailer safety stand of claim 6 wherein the first drive is at least one cylinder pivotally connected to the sled, and including the engagement portion.

8. The collapsible trailer safety stand of claim 1 wherein the sled includes means for locking the sled at one of the stop positions when the support is moved to the second position.

9. The collapsible trailer safety stand of claim 8 wherein the first drive is at least one cylinder including a first end pivoted to the sled, the means for locking comprising a detent extending from the end of the cylinder pivoted to the sled, and which will not interfere with the motion of the sled when the support is in the first position but which engages one of the reinforcing members of the base when the support moves to the second position.

10. The collapsible trailer safety stand of claim 9 wherein the reinforcing members are flat plates interconnecting the sides of the base proximate each stop position.

11. The collapsible trailer safety stand of claim 1, where the bearing members are rollers.

12. The collapsible trailer safety stand of claim 1 wherein the at least one stabilizing arm and the at least one lifting arm cooperate to maintain the support substantially horizontal at all times whether in the first, second, third, or alternative positions or moving therebetween.

13. A collapsible machine comprising:

a stationary base having first and second ends and having at least one rail extending the length of the base, a sled moveable within the base between the first and second ends of the base, the sled having side members, and bearing members extending laterally away from the side members and into engagement with the at least one rail of the base, the bearing members being prevented from leaving the at least one rail by the side members of the sled and the at least one rail, the base including a plurality of reinforcing members defining stop positions for the sled between the ends of the base, the sled having pivotally attached thereto at least one lifting arm and at least one stabilizing arm, each of the at least one lifting and stabilizing arms having a proximal end pivotally attached to the sled, and a distal end, the arms having pivotally attached, at their respective distal ends, a support, the arms and the support being moveable from a first position wherein the support is disposed substantially flat within the sled, to a second position wherein the support is disposed a vertical distance from the sled and the base, the at least one lifting and stabilizing arms being engaged with a first drive, which drives the arms to move the support from the first position to the second position, the sled being moveable within the base, when the support is in the first stored position, to and from proximate a predetermined position by a second drive to locate the sled at one of the stop positions so that the support is able to accurately move at least to the second position, whereby the machine when in the second position may be used as a safety stand.

14. The collapsible machine of claim 13, wherein the sled includes a sensor in communication with the second drive to sense when the sled is adjacent the predetermined position to locate the sled thereat such that when the support moves it will be in the correct second position.

15. The collapsible machine of claim 13 wherein the support is a kingpin engaging mechanism.

16. The collapsible machine of claim 13 wherein the sled includes means for locking the sled at the stop positions when the support is moved to the second position.

17. The collapsible machine of claim 16 wherein the first drive is at least one cylinder including a first end pivoted to the sled, the means for locking comprising a detent extending from the end of the cylinder pivoted to the sled, and which will not interfere with the motion of the sled when the support is in the first position but which engages one of the reinforcing members of the base when the support moves to the second position.

18. A collapsible trailer safety stand for engaging an unfettered trailer adjacent the kingpin thereof, the kingpin being disposed adjacent the nose of the trailer, the safety stand comprising:

a base having first and second ends, a sled movable along the base between the first and second ends thereof, a supporting assembly carried on the sled and movable relative to the base between a collapsed, stored position, wherein the supporting assembly is disposed substantially flat within the base, and a raised, supporting position, in which a portion of the supporting assembly is disposed vertically above the base to engage and support the trailer adjacent the kingpin thereof, a sensor for sensing the nose of the trailer, the sensor being operatively connected to the sled and the supporting assembly such that the supporting assembly remains in the stored position as it moves with the sled relative to the base between the first and second ends of the base, and moves to the supporting position in response to the sensor sensing the nose of the trailer, such that the supporting assembly is properly positioned adjacent the kingpin of the trailer to support the front nose of the trailer when the supporting assembly is in the supporting position.

19. The collapsible trailer safety stand of claim 18, wherein the supporting assembly comprises:

at least one stabilizing arm and at least one lifting arm, each having a first end pivotally attached to the sled, and a second end, a support, the support being pivotally attached to the at least one stabilizing and at least one lifting arms at the respective second ends thereof, the support engaging and supporting the trailer adjacent the kingpin when the supporting assembly is in the supporting position, a first drive pivotally connected to the sled and operatively connected to the at least one stabilizing and lifting arms to drive the arms to move the support into engagement and support of the trailer adjacent the kingpin when the supporting assembly is in the supporting position.

20. The collapsible trailer safety stand of claim 19, wherein the first drive is operatively connected to the sensor such that the first drive moves the support into engagement and support of the nose of the trailer adjacent the kingpin upon the sensor sensing the nose of the trailer.

21. The collapsible trailer safety stand of claim 18, and including a locking mechanism for locking the sled and supporting assembly in position between the first and second ends of the base.

* * * * *